US007912510B2

(12) United States Patent
Park et al.

(10) Patent No.: US 7,912,510 B2
(45) Date of Patent: Mar. 22, 2011

(54) TERMINAL FOR MULTIMEDIA RING BACK TONE SERVICE AND METHOD FOR CONTROLLING TERMINAL

(75) Inventors: Seongsoo Park, Seoul (KR); Sangshin Lee, Seoul (KR); Daesic Woo, Seongnam-si (KR); Seongkeun Kim, Seoul (KR); Sehyun Oh, Seoul (KR); Myungsung Lee, Seoul (KR)

(73) Assignee: SK Telecom Co., Ltd. (KR)

( * ) Notice: Subject to any disclaimer, the term of this patent is extended or adjusted under 35 U.S.C. 154(b) by 550 days.

(21) Appl. No.: 11/572,176

(22) PCT Filed: Jul. 8, 2005

(86) PCT No.: PCT/KR2005/002199

§ 371 (c)(1),
(2), (4) Date: Jan. 16, 2007

(87) PCT Pub. No.: WO2006/009362

PCT Pub. Date: Jan. 26, 2006

(65) Prior Publication Data

US 2007/0224973 A1 Sep. 27, 2007

(30) Foreign Application Priority Data

Jul. 16, 2004 (KR) ........................ 10-2004-0055531

(51) Int. Cl.
*H04M 1/00* (2006.01)
*H04M 3/42* (2006.01)
*H04M 3/00* (2006.01)

(52) U.S. Cl. ...................... 455/567; 455/419; 455/414.1

(58) Field of Classification Search .................. 455/401, 455/425, 433, 567, 419, 414.1

See application file for complete search history.

(56) References Cited

U.S. PATENT DOCUMENTS

| 5,583,915 | A | * | 12/1996 | Ishida | 455/412.1 |
|---|---|---|---|---|---|
| 6,349,204 | B1 | * | 2/2002 | Goetz et al. | 455/419 |
| 6,496,954 | B1 | * | 12/2002 | Ono | 714/795 |
| 7,020,497 | B2 | * | 3/2006 | Deeds | 455/567 |
| 7,130,618 | B2 | * | 10/2006 | Yokoyama | 455/414.1 |
| 7,233,658 | B2 | * | 6/2007 | Koser et al. | 379/373.01 |
| 7,515,898 | B2 | * | 4/2009 | Chin et al. | 455/401 |
| 2004/0092295 | A1 | * | 5/2004 | Yamada | 455/567 |

(Continued)

FOREIGN PATENT DOCUMENTS

JP 11-74979 3/1999

(Continued)

*Primary Examiner* — Jinsong Hu
*Assistant Examiner* — Mong-Thuy Tran
(74) *Attorney, Agent, or Firm* — Baker & Hostetler, LLP (57) ABSTRACT

Disclosed is a method for controlling a terminal for a multimedia Ring Back Tone (RBT) service, which allows RBT sound sources previously set in a sound source-providing server by a called subscriber to be reproduced to an originating terminal by means of a Home Location Register (HLR) and the sound source-providing server for storing the RBT sound sources when a calling subscriber telephones the called subscriber, the HLR storing profile information including whether the subscriber has joined the RBT service. The method includes the steps of: (a) receiving a codec setup message including information (multimedia codec information) regarding a multimedia codec from a switching center; (b) deactivating a decoding function of a voice codec; (c) activating a decoding function of the multimedia codec; (d) receiving the RBT sound sources; and (e) decoding the RBT sound sources through the multimedia codec and reproducing the decoded RBT sound sources.

17 Claims, 6 Drawing Sheets

U.S. PATENT DOCUMENTS

| | | | |
|---|---|---|---|
| 2004/0120494 A1* | 6/2004 | Jiang et al. | 379/210.01 |
| 2004/0229594 A1* | 11/2004 | Jung et al. | 455/350 |
| 2007/0123311 A1* | 5/2007 | Kim et al. | 455/567 |
| 2007/0172034 A1* | 7/2007 | Jung | 379/1.01 |

FOREIGN PATENT DOCUMENTS

| | | |
|---|---|---|
| JP | 11-261664 | 9/1999 |
| JP | 2003-274016 | 9/2003 |

\* cited by examiner

TERMINAL FOR MULTIMEDIA RING BACK TONE SERVICE AND METHOD FOR CONTROLLING TERMINAL

FIELD OF THE INVENTION

The present invention relates to a terminal for a multimedia Ring Back Tone (Hereinafter, referred to as RBT) service and a method for controlling the terminal. More particularly, the present invention relates to a terminal for a multimedia RBT service and a method for controlling the terminal, in providing the multimedia RBT service capable of operating a multimedia codec allowing high quality music playback during an RBT interval and operating a voice codec such as an Enhanced Variable Rate Codec (Hereinafter, referred to as EVRC) during voice communication when an originating terminal supports the multimedia codec capable of improving the music quality in addition to a dedicated voice codec such as the EVRC.

BACKGROUND OF THE INVENTION

With the rapid development of computer, electronic and communication technology, various wireless communication services using a wireless network have widely been provided. The most basic wireless communication service is a wireless voice communication service for providing voice communication to mobile communication terminal users in wireless manner, which has a characteristic of providing the service to the users regardless of time and place. Further, the wireless communication service supplements a voice communication service with a text message service. Recently, a wireless Internet service has emerged, which provides an Internet communication service to mobile communication terminal users through a wireless network.

Accordingly, subscribers of a mobile communication service can not only communicate with partners by using a wireless communication service regardless of time and place while freely moving here and there, but also receive various information, such as news, weather, sports, stocks, exchange rates and traffic information, in the form of texts, voice, images, etc.

With the development of mobile communication technology as described above, services provided by a Code Division Multiple Access (Hereinafter, referred to as CDMA) mobile communication system have been developed from voice services to multimedia communication services for transmitting data such as circuit and packet data.

Recently, with the development of information communication, an International Mobile Telecommunication (Hereinafter, referred to as IMT)-2000, e.g., a CDMA 2000 1X, 3X, EV-DO or a Wideband CDMA (WCDMA), has been commercialized, which is the $3^{rd}$ mobile communication system and has been established as a standard by an International Telecommunication Union Recommendation (ITU-R). Further, a wireless Internet service has been provided at a transmission speed of 307.2 Kbps at maximum far faster than 14.4 Kbps or 56 Kbps, which is a data transmission speed supported by an Interim Standard (Hereinafter, referred to as IS)-95A network or an IS-95B network, by means of an IS-95C network evolved from the existing IS-95A network and IS-95B network. In particular, an IMT-2000 service is used, so that the quality of an existing voice and Wireless Application Protocol (WAP) service can be improved and various multimedia services, e.g., Audio On Demand (AOD), Video On Demand (VOD), etc., can be provided at higher speed.

Recently, an RBT service or a so-called coloring RBT service has been highlighted, in which various sounds customized by the user of a call-receiving mobile communication terminal are outputted to a mobile communication terminal or a general telephone of a calling party as RBTs. This RBT service includes a concept for RBTs designated by a called party to be provided to a calling party. That is, the RBT service is a service in which the newest Korean songs, pop songs, a recorded voice, bird or water sounds, etc., can be used as RBTs instead of existing mechanical RBTs, e.g., "ring, ring" sound, occurring during ordinary communication.

The RBT service as described above has been provided, so that a partner can listen to sounds of a sound source customized by a called party instead of uniform and mechanical RBTs. Therefore, the partner can obtain auditory satisfaction.

Figure 1:
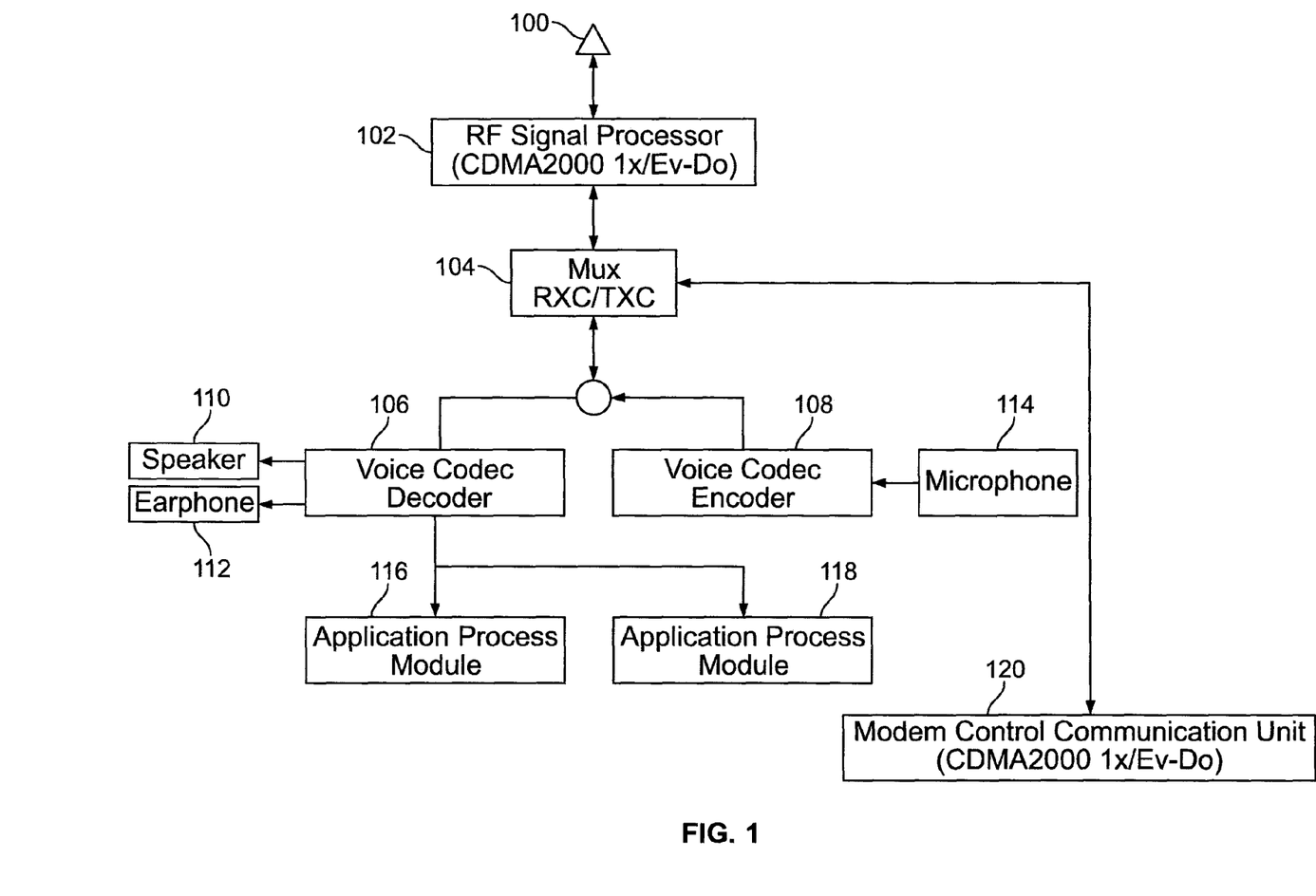
FIG. 1 is a block diagram schematically illustrating the construction of a conventional mobile terminal.

FIG. 1 is a block diagram schematically illustrating the construction of a conventional mobile terminal.

When radio signals are received through an antenna 100, the mobile terminal converts the received radio signals to digital signals through a Radio Frequency (RF) signal processor 102. A MUX 104 determines whether received packets are general data or signal control data. When the received packets are the signal control data, the MUX 104 transfers the received packets to a modem control communication unit 120. However, when the received packets are the general data, the MUX 104 transfers the received packets to a voice codec decoder 106.

The signal control data correspond to a control message for call setup and mobility management of the mobile terminal, and the general data correspond to information for voice and supplementary data services of a user. Frames including errors in the general data transferred to the voice codec decoder 106 are discarded, and only the normal data are transferred to the next element. Herein, when the received data are voice communication data, the received data are transferred to an earphone 112 or a speaker 110 for reproduction. When the received data are realtime multimedia service data, the received data are transferred to and processed by a multimedia process module 118, and then transferred to the speaker 110 or the earphone 112. Further, when the received data are data transferred through a service such as a download service, the received data are stored in a memory.

The modem control communication unit 120 analyzes received control signals and causes each module to operate correspondingly to the analysis result. That is, when a user's voice is inputted through a microphone 114, the modem control communication unit 120 transfers the corresponding voice data to a voice codec decoder 108 so that the voice data can be encoded and transferred to a network through the RF signal processor 102.

Most mobile communication terminals use a voice codec having a variable rate such as an EVRC for the efficiency of voice communication and the optimization of radio channels. The EVRC is a codec for variably coding voice information according to the amount of voice information. That is, the EVRC encodes voice at a low rate during no-sound interval in which speakers do not output sound and encodes voice at high speed when the amount of information is large. It may be understood that this EVRC is an efficient codec as compared with existing codecs for always encoding voice at constant speed. The EVRC is used, so that the system capacity of a CDMA mobile communication system can increase and power consumption can also be minimized.

However, a voice codec having a variable rate such as this EVRC may deteriorate the sound quality for music, such as background sounds having nearly no-sound interval, due to a variable rate coding error. In order to overcome this problem, music service providers have made efforts to minimize the loss of sound sources due to a voice codec by extracting the sound sources and correcting the sound sources according to the EVRC. This sound source correction has depended on pre-processing considering the characteristics of the EVRC or manual operation of a sound specialist.

These processes may improve the quality of the music service through the EVRC nearly up to the level of the voice quality, but it is difficult to improve the quality of the music service because a voice codec has been designed to be suitable for voice communication. Therefore, most high quality music services currently being provided separately use high quality multimedia codecs and provide music through data channels instead of voice channels. Herein, most of these commercialized multimedia service codecs have required transmission speeds over 16 K. Therefore, these are unsuitable for application to a voice channel for providing a rate of about 8 K. Accordingly, most music services using these multimedia service codecs provide realtime services by means of data channels for ensuring a data rate over 16 K or provide services after downloading music files through a download service.

In order to provide a multimedia service for an RBT service using these voice channels, it is indispensable to develop a multimedia codec with a rate of 8 K and provide a mobile communication system and a terminal capable of providing the multimedia service. Herein, the multimedia codec with the rate of 8 K may be developed by reducing a sampling rate from the current multimedia codec standard. However, revision of a mobile communication system and a mobile communication terminal is unavoidable in order to provide the multimedia service.

SUMMARY OF THE INVENTION

Therefore, the present invention has been made in view of the above-mentioned problems, and it is an object of the present invention to provide a terminal for a multimedia RBT service and a method for controlling the terminal, in providing the multimedia RBT service capable of operating a multimedia codec allowing high quality music playback during an RBT interval and operating a voice codec such as an Enhanced Variable Rate Codec (Hereinafter, referred to as EVRC) during voice communication when an originating terminal supports the multimedia codec capable of improving the music quality in addition to a dedicated voice codec such as the EVRC.

According to one aspect of the present invention, there is provided a method for controlling a terminal for a multimedia Ring Back Tone (RBT) service, which allows RBT sound sources previously set in a sound source-providing server by a called subscriber to be reproduced at an originating terminal by using a Home Location Register (HLR) storing profile information including whether the calling and called subscribers are subscribed to the RET service and the sound source-providing server storing the RET sound sources, when a calling subscriber telephones the called subscriber, comprising the steps of: (a) receiving a codec setup message including a multimedia codec information from a switching center; (b) deactivating a decoding function of a voice codec; (c) activating a decoding function of a multimedia codec; (d) receiving the RET sound sources; and (e) decoding the RBT sound sources by using the multimedia codec and reproducing decoded RBT sound sources.

According to another aspect of the present invention, there is provided a method for controlling a terminal by using a splitter for providing a multimedia Ring Back Tone (RBT) service, which allows RBT sound sources previously set in a sound source-providing server by a called subscriber to be reproduced at an originating terminal by using a Home Location Register (HLR) storing profile information including whether the calling and called subscribers are subscribed to the RBT service and the sound source-providing server storing the RBT sound sources, when a calling subscriber telephones the called subscriber, comprising the steps of: (a) receiving a codec setup message including a multimedia codec information from a switching center; (b) switching over a path of received data from a voice codec to a multimedia codec from a voice codec by using the splitter; (c) receiving the RBT sound sources; and (d) decoding the RBT sound sources by using the multimedia codec and reproducing decoded RBT sound sources.

According to further another aspect of the present invention, there is provided a method for controlling a terminal for a multimedia Ring Back Tone (RBT) service, which allows RBT sound sources previously set in a sound source-providing server by a called subscriber to be reproduced at an originating terminal by using a Home Location Register (HLR) storing profile information including whether the calling and called subscribers are subscribed to the RBT service and the sound source-providing server storing the RBT sound sources, when a calling subscriber telephones the called subscriber, comprising the steps of: (a) receiving a codec setup message including information regarding a multimedia codec from a switching center; (b) switching over a path of received data from a voice codec to the multimedia codec; (c) receiving the RBT sound sources; and (d) decoding the RBT sound sources by using the multimedia codec and reproducing decoded RBT sound sources.

According to still another aspect of the present invention, there is provided a terminal for a multimedia Ring Back Tone (RBT) service, which allows RBT sound sources previously set in a sound source-providing server by a called subscriber to be reproduced at an originating terminal by using a Home Location Register (HLR) storing profile information including whether the calling and called subscribers are subscribed to the RBT service and the sound source-providing server storing the RBT sound sources, when a calling subscriber telephones the called subscriber, comprising: a modem control communication unit for deactivating a decoding function of a voice codec and activating a decoding function of a multimedia codec, when a codec setup message including a multimedia codec information is received; and a multimedia process module for decoding the RBT sound sources received through a communication network by the multimedia codec when the decoding function is activated under the control of the modem control communication unit.

According to yet another aspect of the present invention, there is provided a terminal employing a splitter for a multimedia Ring Back Tone (RBT) service, which allows RBT sound sources previously set in a sound source-providing server by a called subscriber to be reproduced at an originating terminal by using a Home Location Register (HLR) storing profile information including whether the calling and called subscribers are subscribed to the RBT service and the sound source-providing server storing the RBT sound sources, when a calling subscriber telephones the called subscriber, comprising: a modem control communication unit for controlling a path of received data such that the path is modified to a multimedia codec from a voice codec when a codec setup message including multimedia codec information is received; the splitter for switching over the path of the received data under the control of the modem control communication unit; and a multimedia process module for decoding the RBT sound sources by using the multimedia codec when the RBT sound sources are received.

According to yet another aspect of the present invention, there is provided a terminal for a multimedia Ring Back Tone (RBT) service, which allows RBT sound sources previously set in a sound source-providing server by a called subscriber to be reproduced at an originating terminal by using a Home Location Register (HLR) storing profile information including whether the calling and called subscribers are subscribed to the RBT service and the sound source-providing server storing the RBT sound sources, when a calling subscriber telephones the called subscriber, comprising: a modem control communication unit for controlling a path of received data such that the path is switched over from a voice codec to a multimedia codec when a codec setup message including multimedia codec information is received; and a multimedia process module for decoding the RBT sound sources received through a communication network by the multimedia codec when the path of the received data is switched over to the multimedia codec under the control of the modem control communication unit.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENTS

Reference will now be made in detail to the preferred embodiment of the present invention. The same reference numerals are used to designate the same elements as those shown in other drawings. In the following description of the present invention, a detailed description of known configurations and functions incorporated herein will be omitted when it may make the subject matter of the present invention rather unclear.

Figure 2:
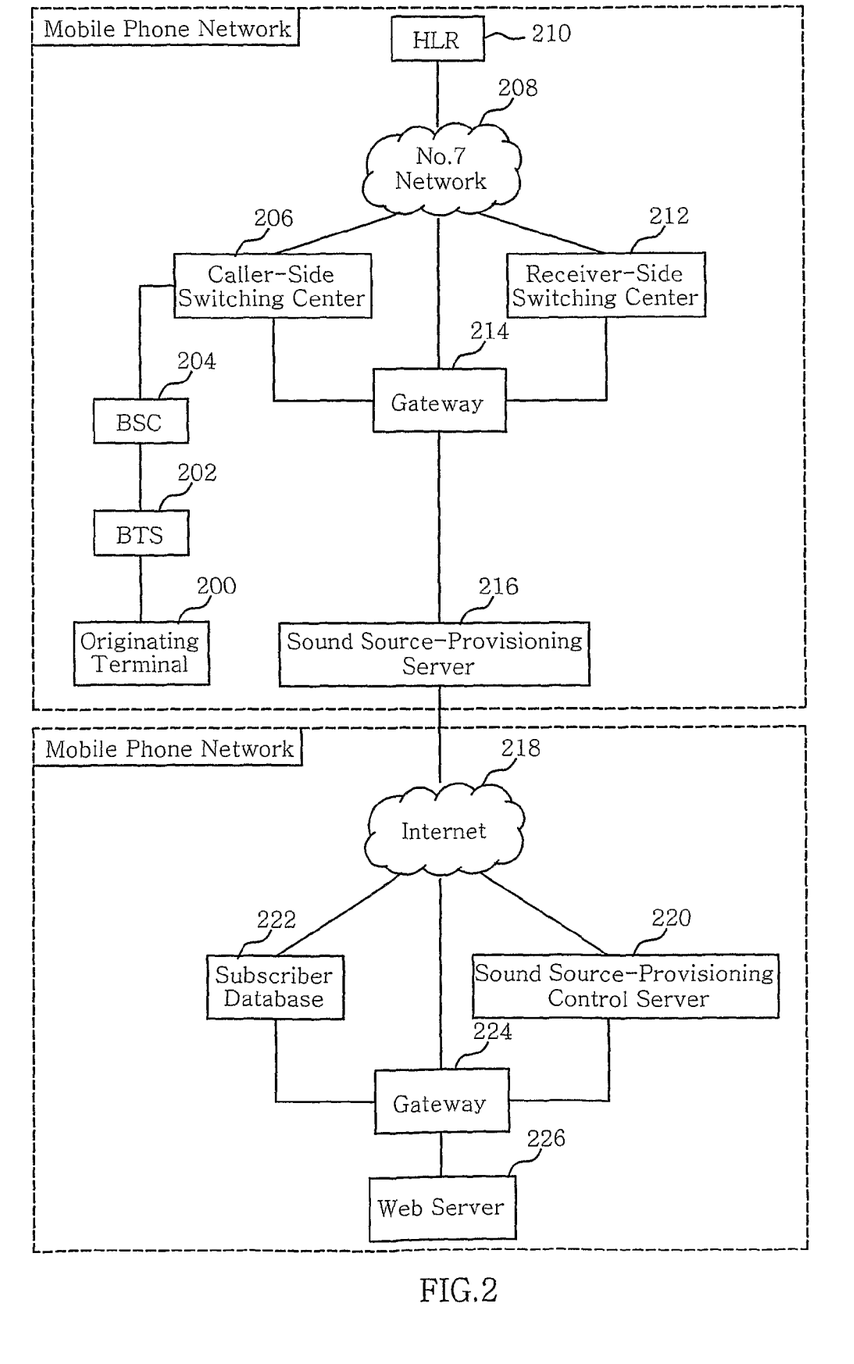
FIG. 2 is a block diagram schematically illustrating the construction of a system for providing a multimedia RBT service according to a preferred embodiment of the present invention.

FIG. 2 is a block diagram schematically illustrating the construction of a system for providing a multimedia RBT service according to a preferred embodiment of the present invention.

As illustrated in FIG. 2, the system for providing the multimedia RBT service according to the preferred embodiment of the present invention may include an originating terminal 200, a Base Transceiver Station (Hereinafter, referred to as BTS) 202, a Base Station Controller (Hereinafter, referred to as BSC) 204, a caller-side switching center 206, a No. 7 network 208, a Home Location Register (Hereinafter, referred to as HLR) 210, a receiver-side switching center 212, gateways 214 and 224, a sound source-providing server 216, the Internet 218, a sound source-providing control server 220, a subscriber database 222, a web server 226, etc.

Hereinafter, each element will be briefly described. The HLR 210 includes subscriber information and communicates with the caller-side switching center 206 and the receiver-side switching center 212 via the No. 7 network 208 based on a Signaling Transfer Protocol (STP). The caller-side switching center 206 and the receiver-side switching center 212 are connected to the sound source-providing server 216 for storing sound sources through the gateway 214. Further, the caller-side switching center 206 and the receiver-side switching center 212 are connected to the BSC 204 in order to support access for mobile communication. The BSC 204 is operable to communicate with a user terminal and perform source allocation and vocoder control for voice communication channels. The sound source-providing server 216 is connected to the subscriber database 222 and the sound source-providing control server 220 through the Internet 218.

Hereinafter, main elements according to the preferred embodiment of the present invention will be described in more detail.

The originating terminal 200 according to the preferred embodiment of the present invention is a terminal capable of performing voice communication and image communication with a counterpart through a mobile communication network and performing data communication through wireless Internet connection. Further, the originating terminal 200 according to the preferred embodiment of the present invention supports an H.245 for a call control, an H.245 for a call setup and a call signaling, an audio codec and a video codec. That is, the originating terminal 200 is a mobile communication terminal capable of receiving a music service, etc., through voice communication channels by using a multimedia codec other than an EVRC for voice communication. Accordingly, when RBT sound sources are received, the originating terminal 200 according to the preferred embodiment of the present invention reproduces the received sound sources by using a multimedia codec.

For example, the multimedia codec may include an Advanced Audio Coding (Hereinafter, referred to as AAA) codec, etc. The AAA employs a voice compression scheme, has been used for a music distribution service using the Internet, etc., and has also been generally used for MP3, Adaptive Transform Acoustic Coding (ATRAC 3), etc. The AAA has a compression rate higher than MP3, but the quality of sound is inferior. Therefore, the AAA is generally suitable for music distribution in the personal communication system, etc.

The detailed construction of the originating terminal 200 according to the preferred embodiment of the present invention will be described with reference to FIG. 5.

The BTS 202 according to the preferred embodiment of the present invention is a network endpoint equipment for directly inter-working with a terminal by performing a baseband signal processing, a wire/wireless conversion, transmission/reception of radio signals, etc. The BTS 202 receives a call attempt from the originating terminal 200 through a traffic channel of signals channels, and transmits the received call attempt to the caller-side BSC 204.

The BSC 204 according to the preferred embodiment of the present invention controls the BTS 202, and performs radio channel allocation and release for a terminal, transmit power control of a terminal and the BTS 202, determination of inter-cell soft handoff and hard handoff, a transcoding, a vocoding, a Global Positioning System (GPS) clock distribution, operation and maintenance for the BTS 202, etc.

When a second codec setup message for setting a multimedia codec is received from the caller-side switching center 206, the BSC 204 according to the preferred embodiment of the present invention sets the multimedia codec by means of multimedia codec information included in the second codec setup message.

In a case where the mobile communication system supports the multimedia codec according to the preferred embodiment of the present invention, when a vocoder setup request is received from the receiver-side switching center 212, a vocoder located in the BSC 204 encodes RBT sound sources by the multimedia codec and transmits the encoded RBT sound sources to the originating terminal 200. For this, the multimedia codec is provided to the BSC 204 in the form of either hardware or software.

Each of the switching centers 206 and 212 according to the preferred embodiment of the present invention performs a control function for an efficient operation of a mobile communication network and a switching function for a communication request of the originating terminal 200. That is, each of the switching centers 206 and 212 performs a processing function for basic and supplementary services of a terminal, a processing function for incoming and originating calls of a subscriber, a location registration procedure, a handoff procedure processing function, an inter-working function with another network, etc. Each of the switching centers 206 and 212 of an IS-95 A/B/C system includes an Access Switching Subsystem (ASS) for performing a distributed call processing function, an Interconnection Network Subsystem (INS) for performing a centralized call processing function, a Central Control Subsystem (CCS) for taking charge of a centralization function of operation and preservation, a Location Registration Subsystem (LRS) for performing storage and maintenance function of information for mobile subscribers, etc. Further, each of the switching centers 206 and 212 for the $3^{rd}$ and the $4^{th}$ generation may include an Asynchronous Transfer Mode (Hereinafter, referred to as ATM) switch. The ATM switch transmits packets by the cell, thereby improving the transmission speed and the efficiency of a circuit use.

When the originating terminal 200 attempts a call connection to a terminating terminal, the caller-side switching center 206 receives information on whether the terminating terminal is subscribed to an RET service, and information (multimedia codec information) on the multimedia codec supported by the originating terminal 200 from the HLR 210. When the terminating terminal is subscribed to the RBT service, the caller-side switching center 206 transmits an ISDN User Part (ISUP) call connection request message including the multimedia codec information to the sound source-providing server 216, receives RBT sound sources convertible by the multimedia codec from the sound source-providing server 216, and transmits the received RBT sound sources to the originating terminal 200 via the BTS 202 and the BSC 204.

Herein, when the caller-side switching center 206 transmits the ISUP call connection request message including the multimedia codec information for a called subscriber-side, the called subscriber-side transmits a first codec setup message including the multimedia codec information to the caller-side switching center 206. Then, the caller-side switching center 206 transmits the second codec setup message for requesting setup of the multimedia codec to the caller-side BSC 204, thereby controlling the caller-side BSC 204 to set the multimedia codec. Further, the caller-side switching center 206 transmits a third codec setup message for requesting setup of the multimedia codec to the originating terminal 200, thereby controlling the originating terminal 200 to set the multimedia codec.

For this, each of the switching centers 206 and 212 communicates with the HTR 210 when location registration of a subscriber is performed, and stores the information regarding whether the subscriber is subscribed to the RBT service, and information for routing to the sound source-providing server 216.

After transmitting the ISUP call connection request message to the sound source-providing server 216, the caller-side switching center 206 requests the BTS 202 and the originating terminal 200 to set the multimedia codec, and activates a routing path for the RBT service.

When a call is answered in the terminating terminal, the receiver-side switching center 212 transmits call termination signals and codec setup change request signals for voice communication of the terminating terminal to the caller-side switching center 206. When the call termination signals are received from the receiver-side switching center 212, the caller-side switching center 206 releases an ISUP call connection with the sound source-providing server 216. Further, when the codec setup change request signals are received from the receiver-side switching center 212, the caller-side switching center 206 requests the BTS 202 and the originating terminal 200 to change a codec setup and allows voice communication to be performed.

The HLR 210 performs functions of recognizing or deleting the registration of a terminal, checking the location of the terminal, etc. Further, the HLR 210 stores profile information including whether a subscriber has joined an RBT service, information for routing to the sound source-providing server 216, and multimedia codec information supported by a subscriber terminal. The multimedia codec information supported by the subscriber terminal is stored as supplementary service subscription information of an originating subscriber profile.

If the multimedia codec supported by the originating terminal 200 is a codec other than the EVRC, and the mobile communication system does not support the multimedia codec, a control message for controlling the RBT sound sources to bypass the caller-side vocoder is transmitted to the caller-side switching center 206 from the receiver-side switching center 212. If the mobile communication system supports the multimedia codec, the receiver-side switching center 212 transmits the received the ISUP call connection request message to the sound source-providing server 216, and receives the RBT sound sources from the sound source-providing server 216 and transmits a vocoder setup request for the multimedia codec to the caller-side vocoder.

The sound source-providing server 216 stores the RBT sound sources. Accordingly, when the ISUP call connection request message is received from the receiver-side switching center 212, the sound source-providing server 216 transmits an RBT sound source selected using the multimedia codec information included in the ISUP call connection request message to the receiver-side switching center 212.

When the mobile communication system does not support the multimedia codec according to the preferred embodiment of the present invention, the sound source-providing server 216 stores various sound sources encoded according to the codec types applicable to the user terminal. However, when the mobile communication system supports the multimedia codec according to the preferred embodiment of the present invention, the sound source-providing server 216 stores various sound sources according to the codec types applicable to the user terminal, the sound sources not being encoded.

This source-providing server 216 is coupled to the switching centers 206 and 212 through the gateway 214, and provides a sound source suitable for the codec type required by the switching centers 206 and 212.

Further, the sound source-providing server 216 generates sound source code request signals including the multimedia codec information received from the caller-side switching center 206, and transmits generated sound source code request signals to the sound source-providing control server 220. Further, the sound source-providing server 216 provides the caller-side switching center 206 with RBT sound sources searched using RBT sound source codes received from the sound source-providing control server 220. The sound source code request signals include the multimedia codec information, identification information of the terminating terminal, identification information of the originating terminal 200, call request time zone information, etc.

The sound source-providing control server 220 communicates with the sound source-providing server 216 through the Internet 218. When the sound source code request signals including the multimedia codec information are received from the sound source-providing server 216, the sound source-providing control server 220 searches for the RBT sound source codes convertible by the multimedia codec and transmits searched RBT sound source codes to the sound source-providing server 216. The RBT sound source codes are separately stored in the sound source-providing control server 220 according to each multimedia codec, each specific caller, each caller group, each originating time.

The web server 226 is coupled to the sound source-providing server 216 or the sound source-providing control server 220 through the Internet 218, adds sound sources to be stored in the sound source-providing server 216, or provides the sound source-providing control server 220 with information for identifying sound sources and a wire/wireless web page for changing RBT sound source codes corresponding to this information. The information for identifying the sound sources may include specific caller information, caller group information, or an originating time zone, etc.

Figure 3:
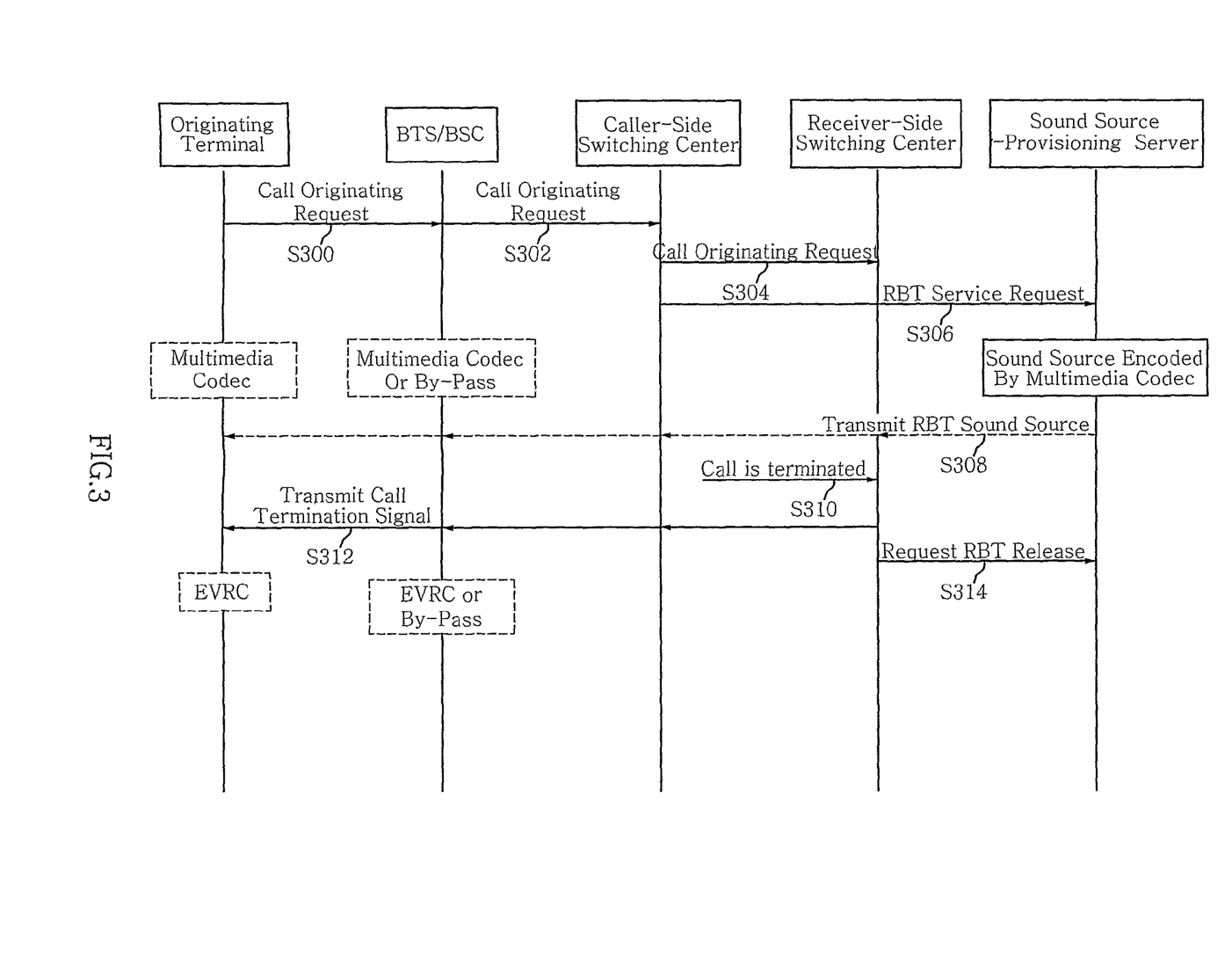
FIG. 3 is a flow diagram schematically illustrating a process for providing a multimedia RBT service according to a preferred embodiment of the present invention.

FIG. 3 is a flow diagram schematically illustrating a process for providing the multimedia RBT service according to a preferred embodiment of the present invention.

When the originating terminal 200 including a multimedia codec transmits a call originating request to the BTS 202 and the BSC 204 (S300), the BTS 202 and the BSC 204 transfer the call originating request to the caller-side switching center 206 (S302). The caller-side switching center 206 transmits a call connection request to the receiver-side switching center 212 (S304) and simultaneously transmits an RBT service request to the sound source-providing server 216 (S306).

As described above, the sound source-providing server 216 stores the RBT sound sources suitable for the multimedia codec used in the originating terminal 200, and transmits the RBT sound sources to the originating terminal 200 through the receiver-side switching center 212 and the caller-side switching center 206 (S308).

Herein, when the mobile communication system does not support the multimedia codec, the RBT sound sources transferred from the sound source-providing server 216 bypasses the multimedia codec because the RBT sound sources are already encoded. However, when the mobile communication system supports the multimedia codec, the vocoder located in the caller-side BSC 204 encodes the received sound sources by using the multimedia codec and transmits encoded sound sources to the originating terminal 200.

The originating terminal 200 reproduces the received RBT sound sources by using the multimedia codec. Then, when a call is answered at the terminating terminal (S310), the receiver-side switching center 212 transmits call termination signals for indicating the answering to the caller-side switching center 206 (S312). Further, the caller-side switching center 206 having received the call termination signals requests the sound source-providing server 216 to release an RBT (S314), and controls a vocoder of the BSC 204 and a voice codec of the originating terminal 200 in order to prepare and perform voice communication.

Figure 4:
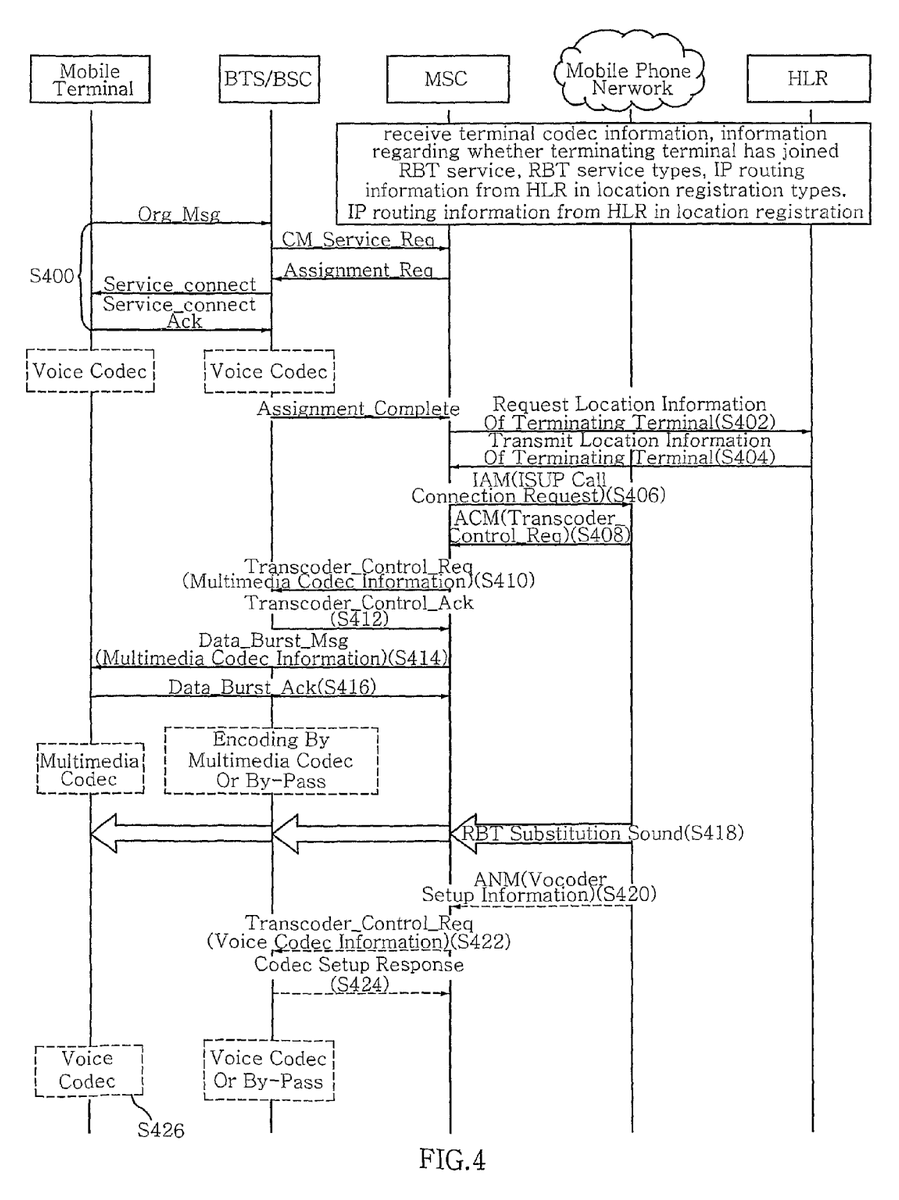
FIG. 4 is a flow diagram illustrating, in detail, a process for providing a multimedia RBT service according to a preferred embodiment of the present invention.

FIG. 4 is a flow diagram illustrating, in detail, the process for providing the multimedia RBT service according to a preferred embodiment of the present invention.

When the originating terminal 200 attempts a call on a terminating terminal, the caller-side switching center 206 performs radio resource allocation, channel allocation and vocoder allocation for the BSC 204 (S400). The BSC 204 performs a negotiation for a service with the originating terminal 200 through the BTS 202. In this process, the originating terminal 200 informs the BSC 204 of voice codec information used in voice communication, and the BSC 204 performs voice codec setup and voice communication channel allocation. Through this process, codec synchronization is accomplished between the originating terminal 200 and the mobile communication network. The BSC 204 notifies the caller-side switching center 206 of the voice communication channel allocation.

When the caller-side radio call setup is completed, the caller-side switching center 206 requests the HLR 210 to transmit location information of the terminating terminal (S402). The HLR 210 transmits the location information of the terminating terminal to the caller-side switching center 206 (S404). Herein, the caller-side switching center 206 also receives information on whether the terminating terminal is subscribed to the RBT service, and information regarding the multimedia codec supported by the originating terminal 200 together with the location information of the terminating terminal.

The caller-side switching center 206 transmits the ISUP call connection request message to the mobile phone network in order to report that there is a call out request for the terminating terminal by means of an IAM message (S406). The ISUP call connection request message includes the information regarding the multimedia codec supported by the originating terminal 200.

Next, for the multimedia RBT service, the mobile phone network transmits a first codec setup message to the caller-side switching center 206 before an RBT service interval (S408). The caller-side switching center 206 requests the BSC 204 and the originating terminal 200 to perform codec setup for the multimedia RBT service (S410 and S414). Herein, a message transmitted from the caller-side switching center 206 to the BSC 204 is defined as a second codec setup message, and a message transmitted from the BSC 204 to the originating terminal 200 is defined as a third codec setup message.

Herein, it is preferred to use a message Transcoder_Control_Req defined in an existing interface between the BSC 204 and a mobile phone switching center as the first codec setup message and the second codec setup message. Further, an RBT codec field should be added to the message so that the message can transmit multimedia codec information. Herein, it is preferred to set the RBT codec field to 4 bits and insert the multimedia codec information into the RBT codec field. However, the scope of the present invention is not limited to these conditions.

The BSC 204 sets a corresponding codec based on the multimedia codec information included in the second codec setup message transferred from the caller-side switching center 206. If the BSC 204 supports the multimedia codec for the multimedia RBT service by hardware, the BSC 204 encodes a corresponding sound source and sets the codec. Otherwise, it is necessary to bypass the vocoder of the BSC 204 and synchronize the multimedia codec information between the originating terminal 200 and the sound source of the RBT service system.

The caller-side switching center 206 may also request the originating terminal 200 to perform the multimedia codec setup for the multimedia RBT service. For this, the caller-side switching center 206 should transfer the multimedia codec information for the multimedia RBT service to the originating terminal 200. In order to transfer corresponding information to a mobile terminal while minimizing an effect on the current mobile phone system, it is efficient to use a data burst message Data Burst. Further, the RBT codec field may be added to the data burst message so that the multimedia codec information to be set by the originating terminal 200 can be transmitted. Herein, it is preferred to set the RBT codec field to 4 bits and insert the multimedia codec information into the RBT codec field. However, the scope of the present invention is not limited to these conditions.

The originating terminal 200 having received the third codec setup message including the multimedia codec information transferred from the caller-side switching center 206 deactivates the decoding function of the voice codec therein but activates the decoding function of the multimedia codec. In this way, the originating terminal 200 receives the RBT sound source encoded by the multimedia codec, decodes the received RBT sound source through the multimedia codec, and reproduces the decoded RBT sound source. This will be described in detail with reference to FIG. 5.

When the RBT interval ends, the caller-side switching center 206 transmits a voice codec setup message to the BSC 204, thereby requesting a change to a voice codec (S422). Herein, it is preferred to use the message Transcoder_Control_Req defined in the existing interface between the BSC 204 and the mobile phone switching center as the voice codec setup message. Further, an RBT codec field may be added to the message so that the message can transmit voice codec information. Herein, it is preferred to set the RBT codec field to 4 bits and insert the multimedia codec information into the RBT codec field. However, the scope of the present invention is not limited to these conditions.

Meanwhile, it is also possible to determine the change to the voice codec by using information included in a connection setup message (e.g., an alert message, a connect message) received in a call termination in an existing call procedure, without separately transmitting a message to the terminal. When the originating terminal 200 detects the change to the voice codec, the originating terminal 200 activates the decoding function of the voice codec by using information included in the connection setup message, thereby supporting voice communication. Herein, the voice codec information that should be set by the terminal may include information on a voice codec, negotiated in a call origination procedure.

Further, when voice codecs for voice communication of the originating terminal 200 and the terminating terminal match with each other, the caller-side switching center 206 controls a corresponding sound source to bypass the caller-side vocoder located in the BSC 204.

Figure 5:
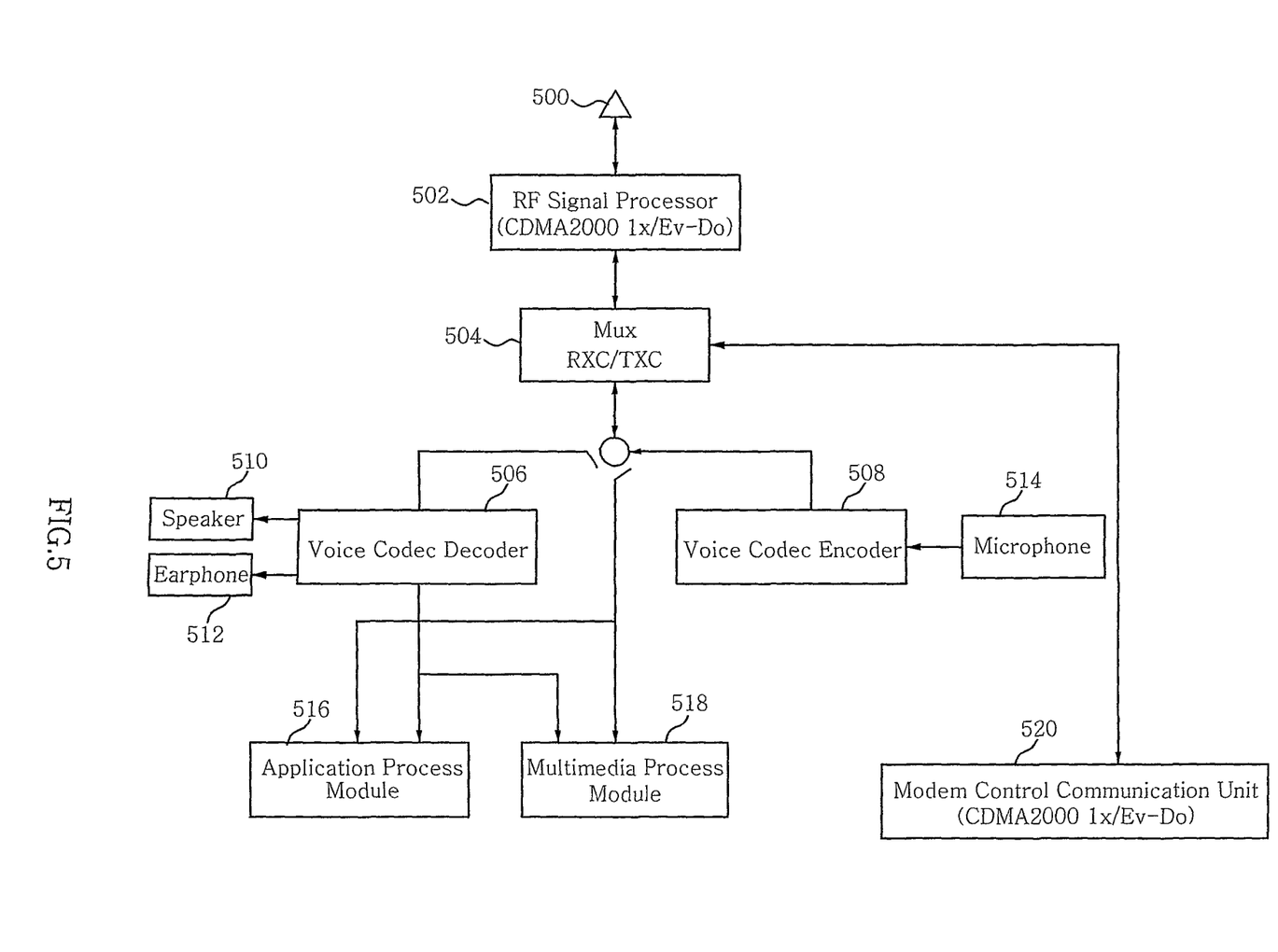
FIG. 5 is a block diagram schematically illustrating the construction of a terminal according to a preferred embodiment of the present invention.

FIG. 5 is a block diagram schematically illustrating the construction of the terminal according to a preferred embodiment of the present invention.

As illustrated in FIG. 5, the terminal according to the preferred embodiment of the present invention may include an antenna 500, a Radio Frequency (RF) signal processor 502, a MUX 504, a voice codec decoder 506, a voice codec encoder 508, a speaker 510, an earphone 512, a microphone 514, an application process module 516, a multimedia process module 518, and a modem control communication unit 520, etc. Further, a description on the conventional elements of the terminal used in the mobile communication network from among the elements illustrated in FIG. 5 will be omitted.

A difference that the inventive terminal has from the conventional terminal is that received RBT sound source data bypasses a voice codec decoder of the terminal for a multimedia RBT. Accordingly, the inventive terminal includes changed software for executing such a function.

The RF signal processor 502 is operable to convert transmission message signals to RF signals and outputs the RF signals to the antenna 500, or converts RF signals applied from the antenna 500 to reception message signals (RXIQ) and outputs the reception message signals to the MUX 504. The antenna 500 is operable to sends the RF signals to the air or transfers RF signals received from the air to the RF signal processor 502.

When the third codec setup message including the multimedia codec information is received from the caller-side switching center 206, the modem control communication unit 520 controls the path of received data such that the path is modified from the voice codec decoder 506 to the multimedia codec of the multimedia process module 518. Further, when a connection setup message is received from the receiver-side switching center 212, etc., after a call is answered, the modem control communication unit 520 controls the path of the received data to be modified to the voice codec decoder 506 based on information included in the connection setup message. Herein, the voice codec decoder 506 sets a voice codec, and the set voice codec includes the voice codec negotiated in the call origination procedure.

According to a method for controlling the path of the received data, when the third codec setup message is received from the caller-side switching center 206, the modem control communication unit 520 renders the decoding function of the voice codec decoder 506 deactivated and the decoding function of the multimedia codec in the multimedia process module 518 activated. Further, when the connection setup message is received from the receiver-side switching center 212, etc., after the call is answered, the modem control communication unit 520 renders the decoding function of the voice codec decoder 506 activated based on the information included in the connection setup message.

According to another method for controlling the path of the received data, a splitter may be used at the front stage of the reception unit of the voice codec decoder 506. The splitter according to the preferred embodiment of the present invention is operable to perform a function of modifying the path of the received data under the control of the modem control communication unit 520.

When an RBT sound source is received, the multimedia process module 518 decodes the RBT sound source through the multimedia codec. The received RBT sound source is a sound source encoded by a multimedia codec, and the multimedia process module 518 includes the multimedia codec implemented by software.

Figure 6:
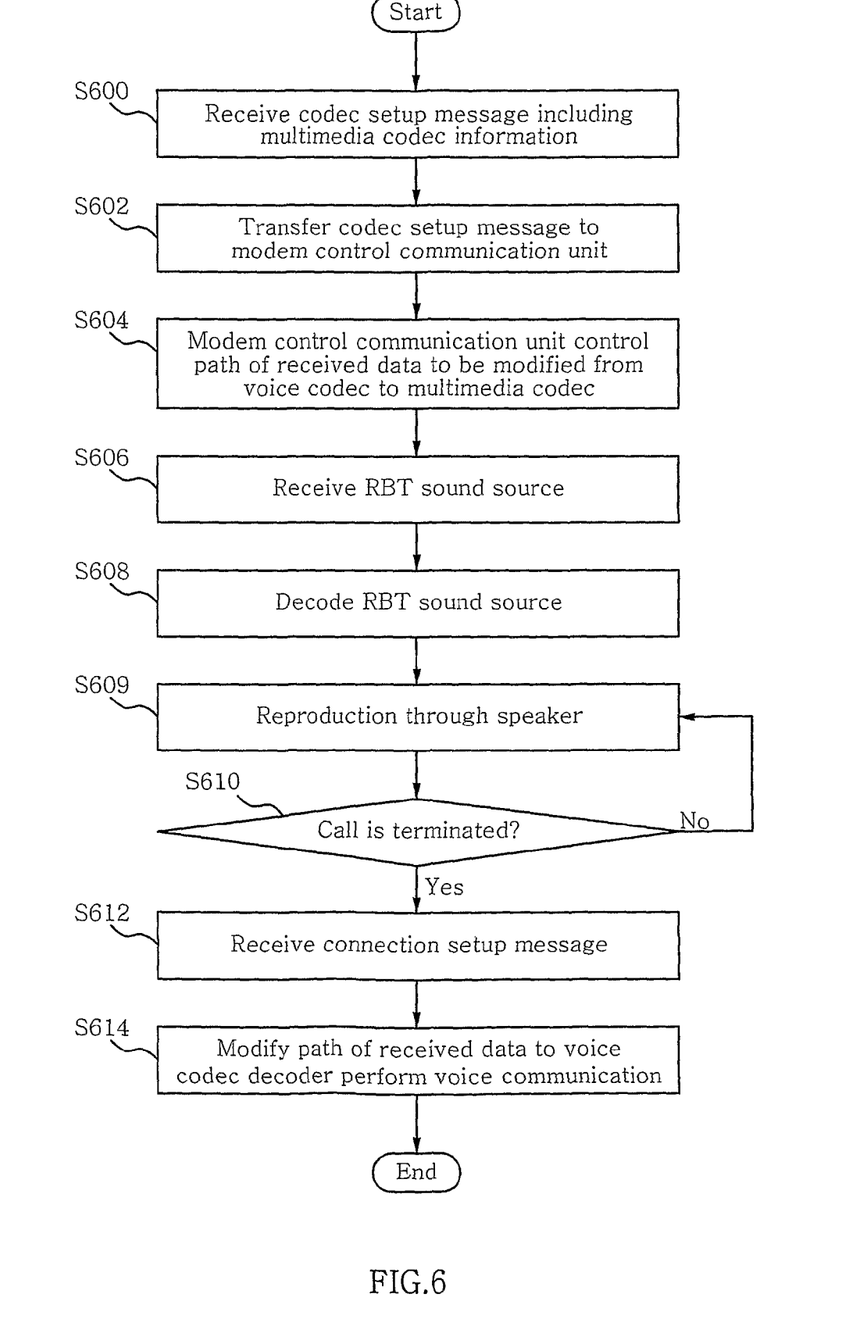
FIG. 6 is a flow diagram schematically illustrating a control process of a terminal for a multimedia RBT service according to a preferred embodiment of the present invention.

FIG. 6 is a flow diagram schematically illustrating the control process of the terminal for the multimedia RBT service according to a preferred embodiment of the present invention.

First, the originating terminal 200 receives a codec setup message including multimedia codec information from the caller-side switching center 206 (S600). The RF signal processor 502 having received the codec setup message transfers the codec setup message to the modem control communication unit 520 through the MUX 504 (S602). The modem control communication unit 520 controls the path of received data such that the path is modified from a voice codec to a multimedia codec (S604).

Modifying the path of the received data may be performed by a method for deactivating the decoding function of the voice codec decoder 506 and activating the decoding function of the multimedia codec in the multimedia process module 518. As described above, it is also possible to use the splitter at the front stage of the voice codec decoder 506 and alternatively provide the path of the received data by means of the splitter.

When an RBT sound source is received through the mobile communication network (S606), the received RBT sound source is decoded by the multimedia codec of the multimedia process module 518 (S608) and reproduced by the speaker 510 (S609).

In the meantime, it is determined as to whether a call has been answered in the terminating terminal (S610). When the call has been answered at the terminating terminal, a connection setup message is received through the RF signal processor 502 (S612). Herein, the modem control communication unit 520 alters the path of received data to the voice codec decoder 506 based on the information included in the connection setup message (S614).

Likewise, the path of the received data may be changed to the voice codec decoder 506 by activating the decoding function of the voice codec decoder 506. Otherwise, the path of the received data may be altered to the voice codec decoder 506 by using the splitter.

As described above, the present invention proposes a scheme capable of operating a multimedia codec allowing high quality music playback during an RBT interval and operating a voice codec such as an EVRC during voice communication in an RBT service using various types of multimedia codecs, so that a high quality RBT service can be provided. Further, the present invention provides a terminal and a control method for the terminal required for providing such a multimedia RBT service, so that it is possible to meet customer requirements for both the music service and the voice communication quality.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

What is claimed is:

1. A method for controlling a terminal for a multimedia Ring Back Tone (RBT) service, which allows RBT sound sources previously set in a sound source-providing server by a called subscriber to be reproduced at an originating terminal by using a Home Location Register (HLR) storing profile information including whether the calling and called subscribers are subscribed to the RBT service and the sound source-providing server storing the RBT sound sources, when a calling subscriber telephones the called subscriber, comprising the steps of:
   (a) receiving a codec setup message including a multimedia codec information from a switching center;
   (b) deactivating a decoding function of a voice codec and activating a decoding function of a multimedia codec in response to the receipt of the codec setup message;
   (c) receiving the RBT sound sources from the sound source providing server;
   (d) decoding the RBT sound sources by using the multimedia codec and reproducing said decoded RBT sound sources;
   (e) receiving a connection setup message when a call is answered by a terminating terminal; and
   (f) activating the decoding function of the voice codec by using information included in the connection setup message and deactivating the multimedia codec in response to the receipt of the connection setup message,
   wherein the codec setup message uses a data burst message Data Burst, and an RBT codec field is added to the data burst message Data Burst.

2. The method as claimed in claim 1, wherein the voice codec to be set by the originating terminal includes a voice codec negotiated in a call origination procedure.

3. The method as claimed in claim 1, wherein the multimedia codec is embodied by software and stored in a multimedia process module or a memory for the multimedia service of the originating terminal.

4. The method as claimed in claim 1, wherein the RBT codec field is set to 4 bits and includes the multimedia codec information.

5. A method for controlling a terminal by using a splitter for providing a multimedia Ring Back Tone (RBT) service, which allows RBT sound sources previously set in a sound source-providing server by a called subscriber to be reproduced at an originating terminal by using a Home Location Register (HLR) storing profile information including whether the calling and called subscribers are subscribed to the RBT service and the sound source-providing server storing the RBT sound sources, when a calling subscriber telephones the called subscriber, comprising the steps of:
   (a) receiving a codec setup message including a multimedia codec information from a switching center;
   (b) switching over a path of received data from a voice codec to a multimedia codec using the splitter in response to the receipt of the codec setup message;
   (c) receiving the RBT sound sources;
   (d) decoding the RBT sound sources using the multimedia codec and reproducing decoded RBT sound sources;
   (e) receiving a connection setup message when a call is answered at a terminating terminal; and
   (f) switching over the path of the received data to the voice codec by using information included in the connection setup message in response to receipt of the connection setup message from the switching center,
   wherein the codec setup message uses a data burst message Data Burst, and an RBT codec field is added to the data burst message Data Burst.

6. The method as claimed in claim 5, wherein, in step (f), the path of the received data is switched over by deactivating a splitting function of the splitter.

7. The method as claimed in claim 5, wherein the multimedia codec is embodied by software and stored in a multimedia process module or a memory for the multimedia service of the originating terminal.

8. The method as claimed in claim 5, wherein the RBT codec field is set to 4 bits and includes the multimedia codec information.

9. A method for controlling a terminal for a multimedia Ring Back Tone (RBT) service, which allows RBT sound sources previously set in a sound source-providing server by a called subscriber to be reproduced at an originating terminal by using a Home Location Register (HLR) storing profile information including whether the calling and called subscribers are subscribed to the RBT service and the sound source-providing server storing the RBT sound sources, when a calling subscriber telephones the called subscriber, comprising the steps of:
(a) receiving a codec setup message including information regarding a multimedia codec from a switching center;
(b) switching over a path of received data from a voice codec to the multimedia codec in response to the receipt of the codec setup message;
(c) receiving the RBT sound sources;
(d) decoding the RBT sound sources by using the multimedia codec and reproducing decoded RBT sound sources;
(e) receiving a connection setup message when a call is answered at a terminating terminal; and
(f) switching over the path of the received data to the voice codec by using information included in the connection setup message in response to receipt of the connection setup message from the switching center,
wherein the codec setup message uses a data burst message Data Burst, and an RBT codec field is added to the data burst message Data Burst.

10. A terminal for a multimedia Ring Back Tone (RBT) service, which allows RBT sound sources previously set in sound source-providing server by a called subscriber to be reproduced at an originating terminal by using a Home Location Register (HLR) storing profile information including whether the calling and called subscribers are subscribed to the RBT service and the sound source-providing server storing the RBT sound sources, when a calling subscriber telephones the called subscriber, comprising:
a modem control communication unit for deactivating a decoding function of a voice codec and activating a decoding function of a multimedia codec, when a codec setup message including a multimedia codec information is received from a switching center;
a multimedia process module for decoding the RBT sound sources received through a communication network by the multimedia codec when the decoding function is activated under the control of the modem control communication unit; and
wherein the modem control communication unit controls the decoding function of the voice codec which is activated by using information included in a connection setup message when the connection setup message is received from the switching center in response to when a call is answered, and
wherein the codec setup message uses a data burst message Data Burst, and an RBT codec field is added to the data burst message Data Burst.

11. The terminal as claimed in claim 10, wherein the multimedia codec is embodied by software and stored in the multimedia process module or a memory.

12. The terminal as claimed in claim 10, wherein the RBT codec field is set to 4 bits and includes the multimedia codec information.

13. A terminal employing a splitter for a multimedia Ring Back Tone (RBT) service, which allows RBT sound sources previously set in a sound source-providing server by a called subscriber to be reproduced at an originating terminal by using a Home Location Register (HLR) storing profile information including whether the calling and called subscribers are subscribed to the RBT service and the sound source-providing server storing the RBT sound sources, when a calling subscriber telephones the called subscriber, comprising:
a modem control communication unit for deactivating a decoding function of a voice codec and activating a decoding function of a multimedia codec and concurrently controlling a path of received data such that the path is modified to a multimedia codec from the voice codec, when a codec setup message including a multimedia codec information is received from a switching center;
the splitter for switching over the path of the received data under the control of the modem control communication unit; and
a multimedia process module for decoding the RBT sound sources using the multimedia codec when the RBT sound sources are received, wherein the modem control communication unit controls the path of the received data to cause the path to switch to the voice codec when the connection setup message is received after a call is answered,
wherein the codec setup message uses a data burst message Data Burst, and an RBT codec field is added to the data burst message Data Burst.

14. The terminal as claimed in claim 13, wherein the switching over of the path of the received data to the voice codec is performed by deactivating a splitting function of the splitter.

15. The terminal as claimed in claim 13, wherein the multimedia codec is embodied by software and stored in the multimedia process module or a memory.

16. The terminal as claimed in claim 13, wherein the RBT codec field is set to 4 bits and includes the multimedia codec information.

17. A terminal for a multimedia Ring Back Tone (RBT) service, which allows RBT sound sources previously set in a sound source-providing server by a called subscriber to be reproduced at an originating terminal by using a Home Location Register (HLR) storing profile information including whether the calling and called subscribers are subscribed to the RBT service and the sound source-providing server storing the RBT sound sources, when a calling subscriber telephones the called subscriber, comprising:
a modem control communication unit for controlling a path of received data such that the path is switched over from a voice codec to a multimedia codec when a codec setup message including multimedia codec information is received from a switching center; and
a multimedia process module for decoding the RBT sound sources received through a communication network by the multimedia codec when the path of the received data is switched over to the multimedia codec under the control of the modem control communication unit,
wherein the modem control communication unit controlling the path of the received data to cause the path to switch to the voice codec when the connection setup message is received from the switching center in response to when a call is answered, and
wherein the codec setup message uses a data burst message Data Burst, and an RBT codec field is added to the data burst message Data Burst.

* * * * *